United States Patent
Thenthiruperai et al.

(10) Patent No.: US 8,189,746 B1
(45) Date of Patent: May 29, 2012

(54) VOICE RENDERING OF E-MAIL WITH TAGS FOR IMPROVED USER EXPERIENCE

(75) Inventors: Balaji S. Thenthiruperai, Overland Park, KS (US); Elizabeth Roche, Prairie Village, KS (US); Brian Landers, Leawood, KS (US); Jesse Kates, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 231 days.

(21) Appl. No.: 12/644,345

(22) Filed: Dec. 22, 2009

Related U.S. Application Data

(62) Division of application No. 10/764,066, filed on Jan. 23, 2004, now Pat. No. 7,672,436.

(51) Int. Cl.
*H04M 1/64* (2006.01)
*G06F 15/16* (2006.01)
*G10L 13/08* (2006.01)

(52) U.S. Cl. .......... 379/88.04; 370/352; 379/88.02; 379/88.17; 379/93.01; 382/119; 704/260; 704/500; 706/10; 707/752; 709/203; 709/206; 709/219; 726/24

(58) Field of Classification Search .......... 370/352; 379/88.04, 88.17, 88.02, 93.01; 704/500, 704/260; 706/10; 707/752; 709/203, 206, 709/219; 382/119; 726/24
See application file for complete search history.

(56) References Cited

U.S. PATENT DOCUMENTS

| | | | |
|---|---|---|---|
| 5,818,447 A | 10/1998 | Wolf et al. | |
| 5,928,325 A * | 7/1999 | Shaughnessy et al. | 709/206 |
| 5,970,449 A | 10/1999 | Alleva et al. | |
| 6,115,686 A | 9/2000 | Chung et al. | |
| 6,141,341 A * | 10/2000 | Jones et al. | 370/352 |
| 6,246,981 B1 | 6/2001 | Papineni et al. | |
| 6,308,151 B1 | 10/2001 | Smith | |
| 6,330,589 B1 | 12/2001 | Kennedy | |
| 6,442,592 B1 | 8/2002 | Alumbaugh et al. | |
| 6,466,654 B1 | 10/2002 | Cooper et al. | |
| 6,507,817 B1 | 1/2003 | Wolfe et al. | |
| 6,539,359 B1 | 3/2003 | Ladd et al. | |
| 6,606,611 B1 * | 8/2003 | Khan | 706/10 |
| 6,629,130 B2 | 9/2003 | Mertama et al. | |

(Continued)

OTHER PUBLICATIONS

Steven L. Rohall, et al., ReMail: A Reinvented Email Prototype, IBM Research Report RC22949 (W0310-166), dated Oct. 28, 2003.

(Continued)

*Primary Examiner* — Gerald Gauthier

(57) ABSTRACT

Tags, such as XML tags, are inserted into email to separate email content from signature blocks, privacy notices and confidentiality notices, and to separate original email messages from replies and replies from further replies. The tags are detected by a system that renders email as speech, such as voice command platform or network-based virtual assistant or message center. For example, the system can detect the signature block or privacy notice tags and not render the signature block or privacy notice as speech. The system can render an original email message in one voice mode and the reply in a different voice mode. The tags can be inserted to identify a voice memo in which a user responds to a particular portion of an email message. Preferably, an email server that receives and stored the email message inserts the tags into the email. Alternatively, the tags could be inserted by an email client application. The tags are detected by an email parser, which can be incorporated into the system rendering email as speech, or, alternatively implemented in a separate logical entity.

11 Claims, 6 Drawing Sheets

U.S. PATENT DOCUMENTS

| | | | |
|---|---|---|---|
| 6,661,877 B1 | 12/2003 | Lee et al. | |
| 6,704,772 B1 | 3/2004 | Ahmed et al. | |
| 6,788,929 B2 | 9/2004 | Hymel | |
| 6,901,364 B2 | 5/2005 | Nguyen et al. | |
| 6,910,134 B1* | 6/2005 | Maher et al. | 726/24 |
| 6,965,926 B1* | 11/2005 | Shapiro et al. | 709/219 |
| 6,980,957 B1* | 12/2005 | Baumgartner et al. | 704/500 |
| 6,987,840 B1* | 1/2006 | Bosik et al. | 379/88.17 |
| 6,990,514 B1 | 1/2006 | Dodrill et al. | |
| 6,996,530 B2 | 2/2006 | Shizuka et al. | |
| 7,027,566 B2* | 4/2006 | Bossemeyer et al. | 379/88.02 |
| 7,043,235 B2 | 5/2006 | Meyer et al. | |
| 7,062,437 B2 | 6/2006 | Kovales et al. | |
| 7,146,320 B2 | 12/2006 | Ju et al. | |
| 7,231,023 B1* | 6/2007 | Begeja et al. | 379/93.01 |
| 7,243,125 B2 | 7/2007 | Newman et al. | |
| 7,260,588 B2* | 8/2007 | Werner | 707/752 |
| 7,280,966 B2 | 10/2007 | Ju et al. | |
| 7,305,342 B2 | 12/2007 | Shizuka et al. | |
| 7,305,441 B2 | 12/2007 | Mathewson, II et al. | |
| 7,406,506 B1* | 7/2008 | Sutton et al. | 709/206 |
| 7,421,690 B2 | 9/2008 | Forstall et al. | |
| 7,505,903 B2 | 3/2009 | Yamamoto | |
| 7,543,018 B2* | 6/2009 | Appelman | 709/203 |
| 7,617,282 B2* | 11/2009 | Han | 709/206 |
| 7,672,436 B1* | 3/2010 | Thenthiruperai et al. | 379/88.04 |
| 7,886,006 B1* | 2/2011 | Freestone et al. | 709/206 |
| 2002/0031243 A1* | 3/2002 | Schiller et al. | 382/119 |
| 2002/0046246 A1 | 4/2002 | Wright et al. | |
| 2002/0052747 A1 | 5/2002 | Sarukkai | |
| 2002/0073157 A1 | 6/2002 | Newman et al. | |
| 2002/0159573 A1* | 10/2002 | Hitzeman et al. | 379/88.17 |
| 2003/0018724 A1 | 1/2003 | Mathewson, II et al. | |
| 2003/0023443 A1 | 1/2003 | Shizuka | |
| 2003/0028380 A1* | 2/2003 | Freeland et al. | 704/260 |
| 2003/0157968 A1 | 8/2003 | Boman et al. | |
| 2003/0200268 A1 | 10/2003 | Morris | |
| 2004/0010559 A1 | 1/2004 | Han | |
| 2004/0052340 A1* | 3/2004 | Joffe et al. | 379/88.17 |
| 2004/0054535 A1 | 3/2004 | Mackie et al. | |
| 2004/0168120 A1 | 8/2004 | Scopes | |
| 2004/0199587 A1 | 10/2004 | McKnight | |
| 2004/0260756 A1 | 12/2004 | Forstall et al. | |
| 2007/0276667 A1 | 11/2007 | Atkin et al. | |
| 2010/0049812 A1* | 2/2010 | Brown et al. | 709/206 |

OTHER PUBLICATIONS

Steven L. Rohall and Dan Gruen, ReMail: A Reinvented Email Prototype, IBM Technical Report # 02-13, Computer Supported Cooperative Work 2002, Nov. 2002.

Musciano and Kennedy, HTML and XHTML: The Definitive Guide, 5th Edition, Aug. 25, 2002. Bibliography Information, p. 1.

Musciano and Kennedy. HTML and XHTML: The Definitive Guide, 5th Edition, Aug. 25, 2002. Chapter 4, pp. 1-10.

Musciano and Kennedy. HTML and XHTML: The Definitive Guide, 5th Edition, Aug. 25, 2002, B.2, pp. 1-35.

U.S. Appl. No. 10/883,889, filed Jul. 2, 2004.

Office Action dated Feb. 19, 2008 in U.S. Appl. No. 10/883,889, filed Jul. 2, 2004.

\* cited by examiner

VOICE RENDERING OF E-MAIL WITH TAGS FOR IMPROVED USER EXPERIENCE

REFERENCE TO RELATED APPLICATIONS

This is a divisional of U.S. patent application Ser. No. 10/764,066, filed Jan. 23, 2004, the entirety of which is hereby incorporated by reference.

BACKGROUND OF THE INVENTION

This invention relates to methods for rendering email messages as voice or speech sound. This invention further relates to the field of network-based computer systems that render email and/or Internet web page content as voice, such systems being embodied in various forms including, but not limited to, voice command platforms, internet-based virtual assistants and interactive voice response systems. The invention can also be embodied as an improvement to an email client application.

Email has emerged over the last decade or so as a convenient and extremely widely used medium for communication. Email messages can be created and displayed on computing devices having an appropriate email application, such as Microsoft Outlook. Email applications are available for desktop computing devices as well as for portable computing devices, e.g., personal digital assistants, so called "hand-held computers", lap-top computers and web-equipped cellular telephones. Thanks to advances in satellite, RF, and other wireless communications technologies, it is now possible to both send and receive email messages on portable computing devices virtually anywhere in the continental Unites States.

As the capability for sending and receiving email message has migrated onto smaller, more lightweight portable devices, such as cellular telephones, the technology has emerged to render email content as voice. Systems for rendering email content as voice are now described in the patent literature. See, for example, Cooper et al., U.S. Pat. No. 6,466,654. This patent describes a network-based server that functions as a "virtual assistant" system. The system includes a virtual assistant server built on a Windows NT telephony server platform that includes a human interface that may be a voice user interface. The virtual assistant server allows a user to use a voice interactive device, such as a telephone, to access and update information, including voice messages, email messages, intranet or internet content, perform scheduling tasks, and still other functions. The entire content of the '654 patent is incorporated by reference herein.

The Virtual Assistant in the '654 patent includes speech recognition software for recognizing speech input from the user and a text to speech converter for rendering text information (such as text from a web document or an email message) into speech, thereby allowing a user to access their email and have it read to them instead of viewing it on a display.

Other patents of interest include U.S. Pat. No. 6,539,359, which is directed to a system that allows a user to access a network communication node that includes a voice response system having a text to speech converter and speech recognition engine. The user accesses the communication node from a variety of communication devices, including telephones. U.S. Pat. No. 6,115,686 is directed to a text to speech converter that converts documents in a Hyper Text Markup Language (HTML) format to speech. The '686 patent recognizes that most of the electronic texts available from the World Wide Web are formatted according to the HTML standard. Unlike other electronic texts, HTML "source" documents, from which content text is displayed, contain embedded textual tags. Generating speech from an electronic originating text intended for visual display presents certain challenges for the TTS converter designers. For example, information is present not only from the content of the text itself but also from the manner in which the text is presented, i.e., by capitalization, bolding, italics, listing, etc. Formatting and typesetting codes of a text normally cannot be pronounced. Punctuation marks, which themselves are not spoken, provide information regarding the text. In addition, the pronunciation of text strings, i.e., sequences of one or more characters, is subject to the context in which text is used. The '686 patent attempts to solve this problem and provide a better user experience in rendering Web content as speech. Lee et al., U.S. Pat. No. 6,661,877 is directed to a system and method for providing access to a unified message store logically storing computer telephony messages, and is further provided to illustrate the current state of the art. The entire content of U.S. Pat. Nos. 6,661,877, 6,539,359 and 6,115,686 is incorporated by reference herein.

The present inventors have appreciated that the user's experience when receiving or responding to email messages as voice is less than optimal when prior art approaches are used, particularly in comparison to the user experience when the email messages are represented graphically as text on a display. The present invention provides techniques and methods for improving the user experience, through the use of tags (e.g., newly defined XML tags) or other analogous software devices that are inserted into the email content. The tags can be inserted by a client email application that generates the email message, or more preferably, by an email server that receives and stores the email. The tags are then detected by the system rendering email content as speech. Numerous ways in which the tags can be used to benefit the user experience are described in further detail below in the detailed description of presently preferred embodiments of the invention.

SUMMARY OF THE INVENTION

In a first aspect, a method is provided for rendering content of an email message as speech. The method includes a step of inserting a tag into the body of the email. The tag may take the form of an XML-type tag. The tags contemplated by this invention are novel and not a part of existing standards. However, new tags to meet the functions described herein can be implemented as extensions to existing standards, such as extensions to the tags supported by XML or equivalent languages. The tag is inserted into the email at a point in the content such that it separates content in the email provided by a first source (such as, for example an original email message from the source of the email) from other content in the email provided by a second source (such as, for example, a reply message from the recipient of the original email message). Thus, for example where the email consists of a reply message followed by an original email message (as is conventional), the tag is inserted into the email at the end of the reply message, such that it separates the reply message from the original email message. Other variations are possible, such as inserting tags before and after the original email message, inserting tags before and after each reply or further response to an original email message, or both.

The step of inserting the tag(s) into the email message can be performed for example by the email client application that the user is using to create the reply message. Existing, known email applications can be modified to add this feature. More preferably, the tag or tags are inserted by a central email server, thus eliminating the need to modify existing email client applications to support this feature.

When the user dials up or otherwise attempts to access their email, the method continues with the step of transmitting the email message to the system for rendering the email as speech. The system may be a voice command platform, virtual assistant, network-based message center, or any other type of system that allows a user to access their email messages in voice form. See, for example, the systems described in the Background section of this document. These systems are known in the art.

The system includes a text-to-speech (TTS) engine that renders documents or text (including email) into speech. The TTS engine supports two or more different voice modes. As used herein, the term "voice modes" means a set of different types of voice sounds, each of which is characterized by such factors as sex of speaker's voice, tone, pitch, speed, accent, etc., sufficient to allow the person hearing the speech to distinguish one voice mode from another. Such modes can be provided in a single TTS engine, or by means of multiple TTS engines, each having different speech characteristics. When the system renders the email message as speech, it parses the email and detects the presence of the tag(s) inserted in the message separating the original email from the reply. When the email is rendered as speech, the first content (such as the original message) is rendered in a first voice mode and the second content (the reply message), is rendered in a second voice mode. Existing standards can be used in this process, including Speech Synthesis Markup Language (SSML). For example, for subsequent rendering of the email content, an email parser (disclosed herein) can insert SSML tags into the email to specifying a particular voice mode, or TTS engine, to use in rendering particular portions of an email.

The feature of rendering the email in different voice modes, with one voice mode for the reply and another for the original message, is useful for voice-based rendering of email. It allows the user to clearly differentiate the original message from the reply message, and makes it easier for the listener to keep track of what part of the email they are listening to. The usefulness is further improved if the email message consists of a long chain of messages, as is frequently the case, such as an original message, a reply, a reply to the reply, a reply from someone who was forwarded the email, etc. In this situation, tags identifying and separating the original message, the reply, the reply to the reply, etc. are inserted into the email, for example by the email server. When the system renders the email as speech, it parses the email content and detects all the tags. As the email is rendered as speech, each contributor's content is rendered in a separate and distinct voice mode. Thus, the listener can more readily ascertain who contributed the content they are listening to due to the changing voice mode. The rendering of the text with the original message and other messages from the original source in one voice mode, and the reply and other messages from the other source (the recipient) in other modes, allows the listener to much more easily recognize who was the source of the portion of the message they are listening to.

The first aspect of the invention described above relates principally to improvements to a email server, or alternatively, an email client application, that inserts XML or other like tags into the email as described in order to separate content from one source from content from another source. In another related aspect of the invention, a method is provided for rendering an email message as speech. This second aspect relates to the functions that are performed by the system that receives email messages and renders the email as speech, such as a voice command platform, networked virtual assistant or message center, or other type of system. The method comprises the steps of processing the email message to identify an original email message and a reply message to the original email message (e.g., by detecting the presence of tags separating the original message from the reply); rendering the original email message as speech in a first voice mode; and rendering the reply message as speech in a second voice mode, with the second voice mode being different from the first voice mode.

As noted, the email may contain content from a third person or source, and the method provides for rendering the content from the third person or source in a third voice mode. Thus, the method may further comprise a step of processing the email message to identify content from a third source and rendering the content from the third source in a third voice mode different from the first and second voice modes.

As an example, suppose A sends an email with an original message to B, and B types in a reply message. The email that B prepares would typically have the reply text followed by the original text. (Some email systems provide a preferences menu which would allow this to be changed to keep the original email at the top, and of course this invention can be modified to take this into account). In accordance with this aspect of the invention, a tag or tags are inserted into the body of the reply message by the central email server, to delineate or separate the original message text and the reply message text. When the person who was the source of the original email goes to check their email, the reply email message is sent to the system the user is accessing (e.g., voice command platform). When the TTS engine in the system reads the reply message to A, the TTS engine can distinguish the parts of the message due to the presence of the tags, reading the original text in a different voice than the reply text. As is apparent, this feature gets even more helpful as the body of an email message contains text from more and more "speakers", i.e., sources. Source A sends an original message to B and C, B replies to all using a speech interface and C replies to all using a text based interface. Any combination of this sort can be handled through the disclosed embodiments or through slight modifications within the ability of persons skilled in the art.

Many email messages, particularly those generated in a work context, include signature blocks. These signature blocks typically contain the name of the employer, complete mailing address of the recipient, phone and fax numbers, email addresses, and perhaps other information. The signature blocks may also be accompanied by privacy and/or confidentiality type notices warning the user not to disclose the contents of the email to others, to delete the email if they have received it in error, etc. Furthermore, the privacy and/or confidentiality notice may be present even when there is no signature block. When email messages are rendered as speech, it can be annoying listening to the signature block, or the privacy or confidentiality notices, rendered as speech. In yet another aspect of this invention, the email server or, less preferably, the client application inserts a tag (such as an XML tag) that separates the signature block (or the confidentiality or privacy notice) from the body of the email content. When the TTS engine in the system renders the email as speech, it detects the presence of the signature block and privacy and confidentiality notice tags. The system may then intelligently avoid rendering the signature block as speech, thereby improving the user experience.

In preferred embodiments, the user of the system that is accessing their email is provided with a set of preferences or parameters that govern how they wish to have their email rendered to them as speech. The user is able to program or configure their email access profile, where they can select to not receive the signature blocks (or privacy and confidentiality notices) as speech or, conversely, select to receive them if they so wish. Alternatively, after they have accessed their email, the user could be prompted to indicate whether they wish to have a signature block, confidentiality notice, and/or privacy notice rendered as speech.

When a person is listening to their emails rendered as speech, the user may wish to insert a voice response directed to a particular part of an email, instead of or in addition to responding to the email as a whole. In yet another aspect of this invention, the user is provided with a method and means for inserting a voice memo (voice comment) at any given point of an email. As one possible example, as the user listens to the email message, they may send a signal to the system that they wish to insert a voice memo. This signal could be sent by a pressing of a particular button on their phone using DTMF signaling techniques. Alternatively, the signal could be provided by a voice command, such as by speaking "insert comment", "comment", or other speech pattern that would be recognizes as a command to insert a voice memo. At this point, the rendering of the email content as speech is temporarily paused. The system inserts a tag into the email that indicates that voice memo is being inserted in the email. The user is then prompted to provide their comment as speech for example by the prompt "Please say the comment you wish to insert. When you are finished, press #." These steps, and a possible confirmation step, could be customized or modified depending on user preferences and implementation design. The speech (voice memo) is stored at that point in the reply message. The system may alternatively store a hyperlink that points to the voice memo as an object to be played out at that point in the message when the reply is rendered as speech. When the system is finished recording the voice memo, the system may then continue with the speech rendering of the original email, and/or prompt the user to find out if the user wants to continue with the rendering of the original email, and/or prompt the user to listen to, confirm, or re-record their voice memo. Later, when the reply message is rendered, the voice memo is inserted into the email. The voice memo could be rendered in a different voice mode, as described above.

As noted above, in preferred embodiments the tag insertion function is performed by logic in a central email server. The logic can potentially be used by any email service provider. However, the email client applications do not need to be modified if the tags are inserted by the email server. Additionally, the tags are inserted into the content so user interface developers can use this feature to suit the interface they are developing, e.g., Voice User Interface; GUI, Handset UI, etc. In preferred embodiments, the content is extracted into an XML format so that it can be used in combination with other XML based languages, e.g., Voice XML, SALT, XHTML, and others.

These and other aspects of the invention will be explained in further detail in the following detailed description of presently preferred embodiments of the invention.

DETAILED DESCRIPTION OF PREFERRED EMBODIMENTS

Overview

Figure 1:
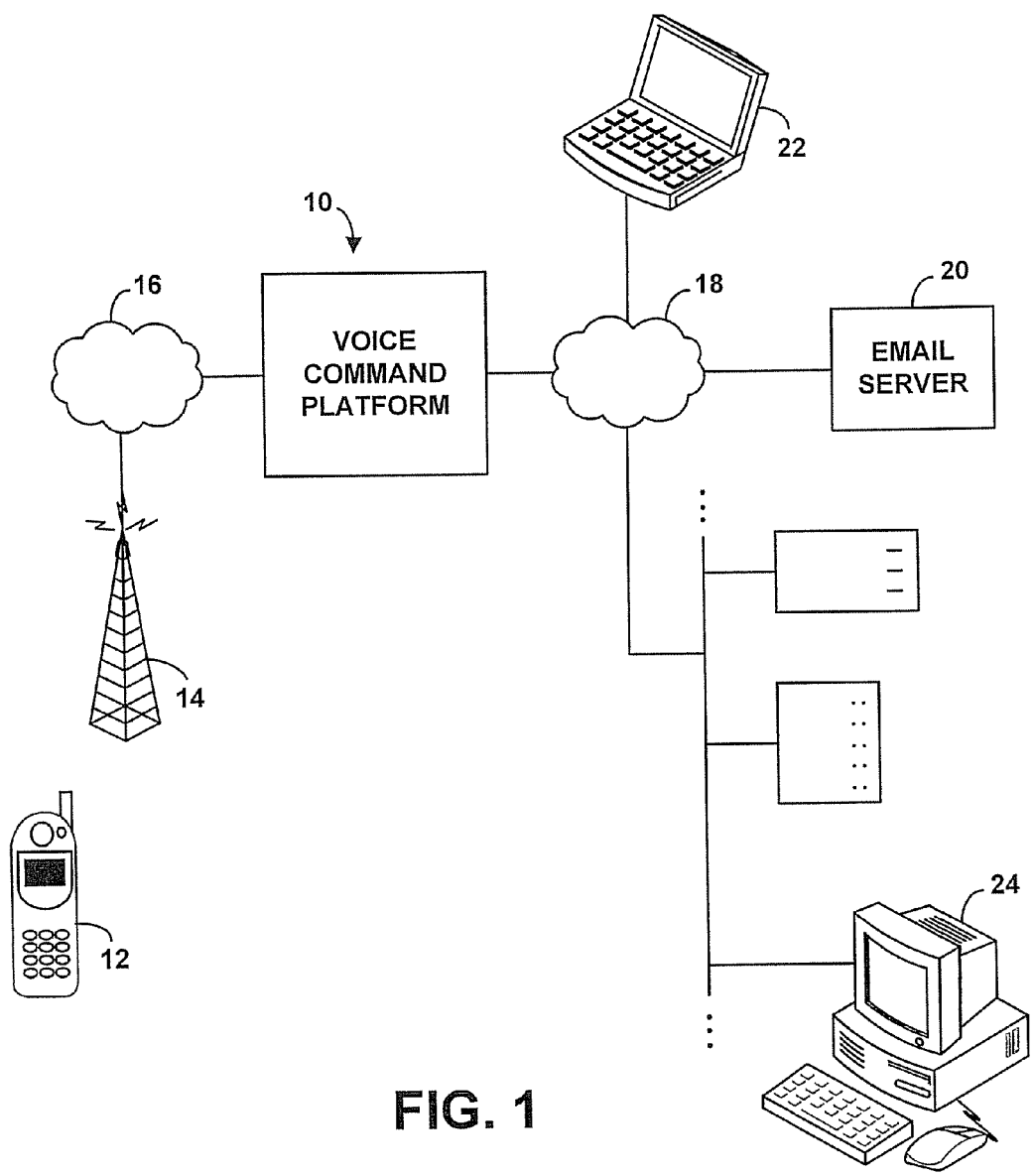
FIG. 1 is a diagram of a representative network environment in which the invention can be practiced.

FIG. 1 is a diagram of a representative network environment in which the invention can be practiced. A network-based system 10 such as a voice command platform, virtual assistant, network message center or other type of system is provided that renders email content as speech for subscribers using wireless communication devices 12. The wireless communication devices 12 can take a variety of forms, including cellular telephones, that have a speaker for providing audio output.

The communication devices 12 communicate with the system 10 via convention cellular telephony equipment that is known in the art, including a wireless base station 14 and elements in a wireless access network 16, including mobile switching center, base station controller, and packet data serving node that couples the wireless access network to a packet switched network. The system 10 is typically implemented as a combination of hardware and software modules that provide the features designed by the operator of the system. These systems are generally known and described in the patent literature, thus a detailed description is omitted. One of the features supported by the system 10 is rendering email content to the subscribers using wireless devices 12 as speech. To do so, the system 10 accesses email content from an email server 20 and renders it as speech. The email server 20 is in communication with the system 10 over a network 18, which may be a local or wide area network. Email content may originate from the subscriber 12, and recipients of the email content shown generally as computers 22 and 24.

As is explained in further detail below, in preferred embodiments, novel XML tags are inserted into email content in order to separate original content from replies, and replies from further replies. XML tags are also inserted in the email content to separate privacy notices and signature blocks from email content. Similarly, tags are inserted into email content to indicate that the email includes a voice memo. These tags are preferably inserted in to the email content by logic executing on the email server 20. In less preferred embodiments, the tags could be inserted by email clients resident on the wireless device 12, and the computers 22 and 24. Alternatively, logic executing in the system 10 could insert the tags, prior to rendering the email as speech for the wireless device 12.

Figure 2:
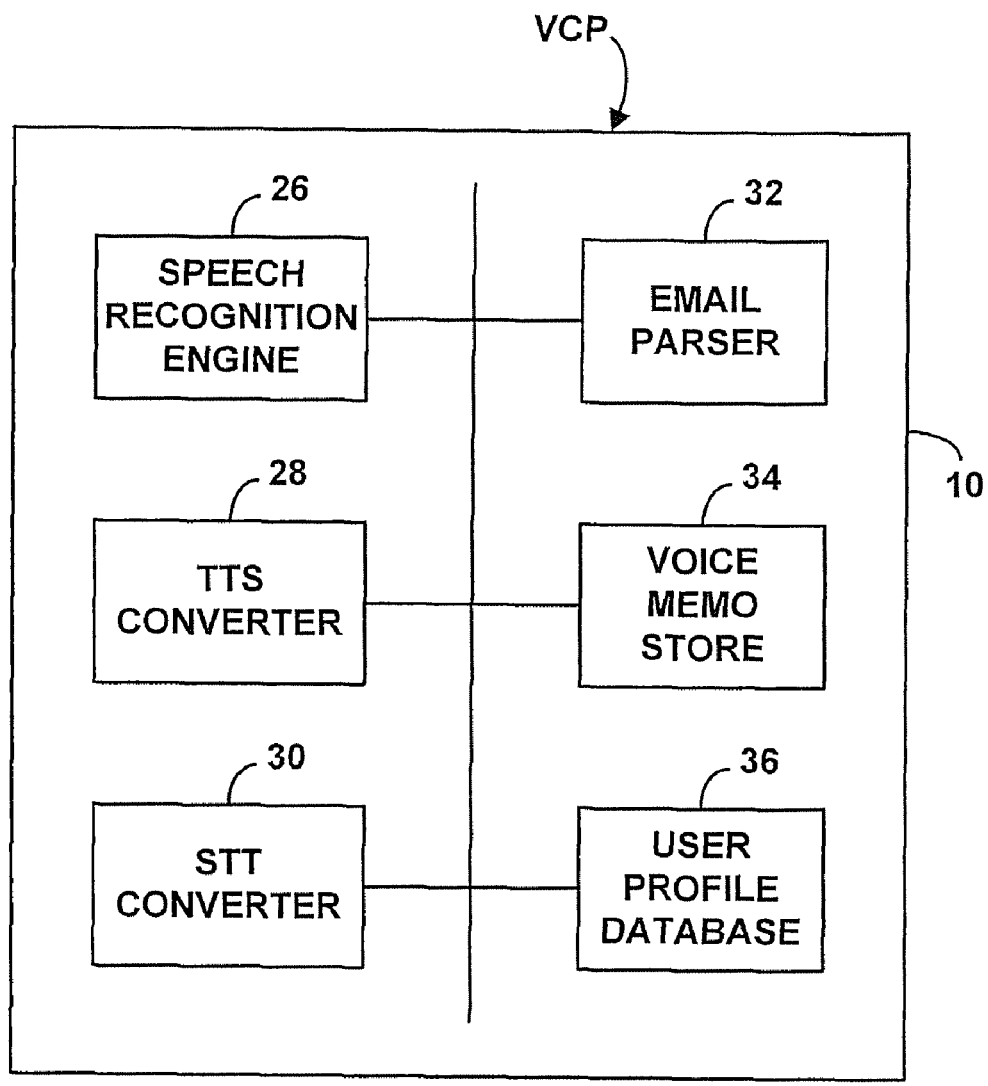
FIG. 2 is a block diagram of components of a voice command platform that indicate the elements that are used in the processing of email tags.

FIG. 2 is a block diagram of software components of a system 10 in the form of a voice command platform, showing elements that are used in the processing of email tags and rendering email as speech. The voice command platform 10 includes a speech recognition engine 26 that recognizes speech input from a user of the wireless device 12. A text to speech (TTS) converter 28 is provided for converting text, such as email content or web content, into speech. In preferred embodiments, the TTS engine 28 is capable in operating in multiple voice modes so that original email content and replies are rendered in different voice modes. The system further includes a speech to text (STT) converter 30 for converting speech input from the user of the wireless device 12 into text, for example, for allowing the user to dictate an original email or dictate a voice memo in response to an email message. The system further includes an email parser 32 that includes logic for parsing the body of an email and detecting the XML tags inserted by the email server (or client application). This parsing and detection of the tags allows the TTS engine to render email as speech in a more user-friendly manner as described herein. The system 10 includes a memory 34 for storing voice memos, either in audio form (.wav file) or as text that is converted into speech. The system 10 also includes a user profile database 36 that stores user preferences for rendering of email as speech, such as preferences for rendering signature blocks, privacy notices, voice modes for original and reply messages, and other preferences that may be provided to the user. The user preferences can be set and updated in any convenient fashion, such as by the user using feature codes to set the favorites, by the use of voice commands, by pressing buttons on the device 12 during an initialization session, or otherwise.

Voice Rendering of Email Responses with Multiple Voice Modes

A first aspect of the invention relates principally to improvements to an email client application, or more preferably, an email server, that inserts tags into an email in order to separate content from one source from content from another source. Suppose for example that the user of the device 12 sends an email message to computer 22. The email for computer 22 is forwarded to the email server serving that computer and the computer 22 sends a reply message back to the device 12. This reply message is stored in the email server 20. The email server parses the reply message and detects the reply message and the original message. The email server 20 inserts an XML tag into the reply message to separate the reply from the original message. For example a tag in the form <REPLY, SOURCE="email address"> could be inserted at the very beginning of the reply and a tag in the form </REPLY> is inserted at the very end of the reply. The SOURCE indicates the email address of the source of the reply (e.g., tom@att.net).

The step of inserting the tag into the email message can be performed for example by the email client application that the user is using to create the reply message. Existing, known email applications can be modified to add this feature. More preferably, the tag is inserted by a central email server 20. This would eliminate the need to modify existing email client applications to support this feature.

Figure 3:
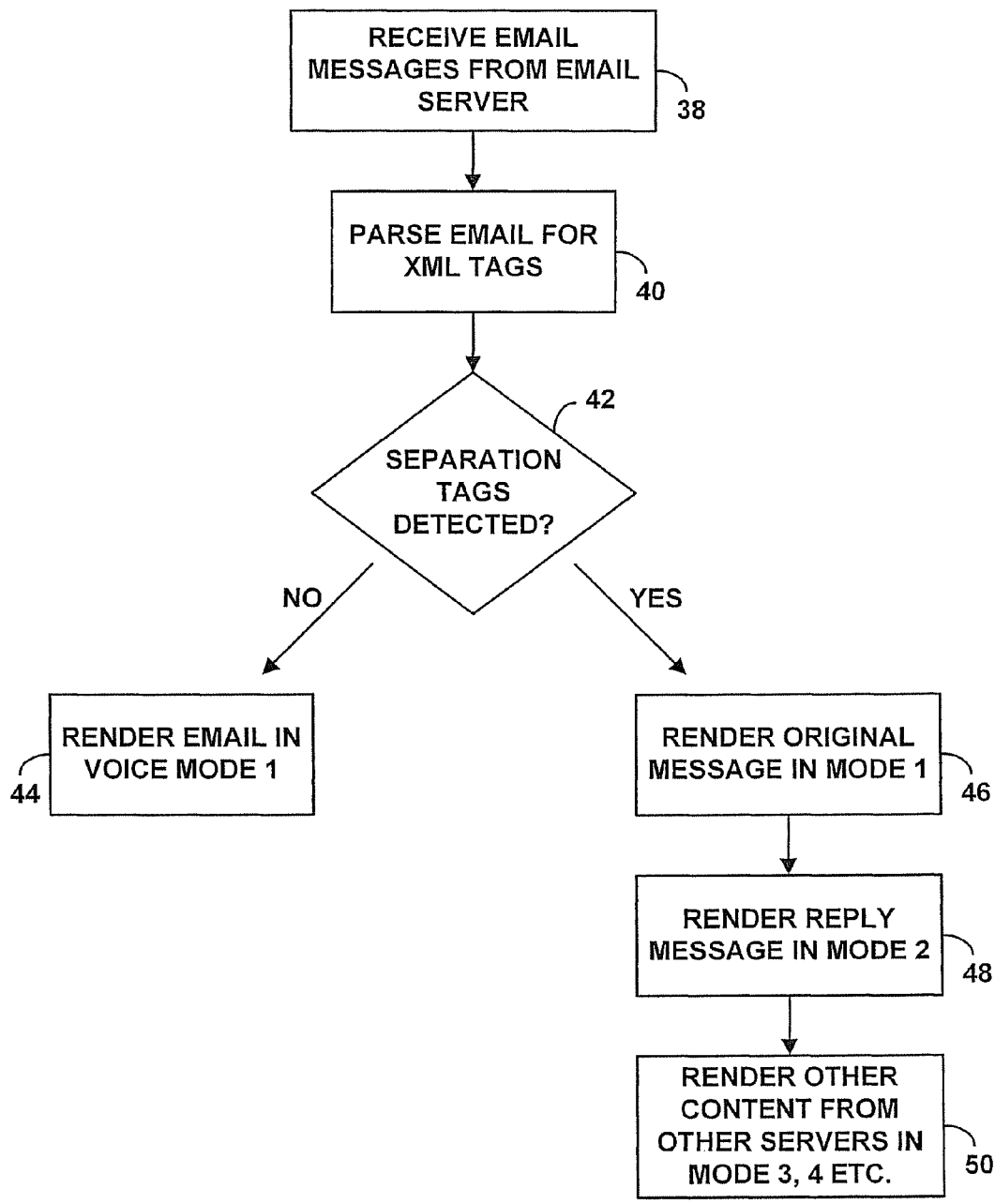
FIG. 3 is a flow chart illustrating the series of steps performed when rendering an email as speech and providing original email content from one source in one voice mode and a reply content in a second voice mode.

The process of the system 10 using the tags is shown in FIG. 3. Suppose now the user 12 accesses the system 10 to check his or her email messages. The method includes a step 38 of accessing or otherwise retrieving the email messages from the server 20.

As noted above, the system 10 includes a text-to-speech (TTS) engine 28 that renders documents or text (including email) into speech. The TTS engine supports two or more different voice modes. The voice modes sound sufficiently different from each other so as to allow the person hearing the speech to distinguish one voice mode from another. Such modes can be provided in a single TTS engine, or by means of multiple TTS engines, each having different speech characteristics. The user navigates or otherwise commands the system to render their email as speech. When the system renders the email message as speech, the method includes a step 40 in which the email parser 32 parses the email and detects the presence of the tag(s) inserted in the message separating the original email from the reply. If there are no separation tags detected at step 42, the TTS engine proceeds to render the email in only one voice mode, in conventional fashion. This would be the case for example if the email is simply an original email message from, e.g., computer 24 in FIG. 1. If, at step 42, email separation tags are detected, the process proceeds to step 46 and the original message is rendered in one voice mode. At step 48, the reply is rendered in a separate voice mode. Similarly, if there is a further reply by an additional third party (e.g., if computer 24 had also received the email and had issued a reply) this further reply would stored in the email server 20, an XML tag added by the server 20, and when that reply is rendered to the wireless device 12 it would be rendered in a third voice mode, as indicated at step 50. These steps 46-50 could be performed in a different order depending on user preferences or system configuration. To the extent that an email message has multiple replies "ping-ponging" back and forth between the source of the original email and the recipient, tags would be inserted between each reply such that all email messages sent by the source are in voice mode #1, and all reply messages sent by the recipient are rendered in voice mode #2.

The feature of rendering the email in different voice modes, with one voice mode for the reply and another for the original message, is useful for voice-based rendering of email. It allows the user to clearly differentiate the original message from the reply message. The usefulness is further improved if the email message consists of a long chain of messages, as is frequently the case, such as an original message, a reply, a reply to the reply, etc. In this situation, tags identifying the original message, the reply, the reply to the reply, etc. are inserted into the email, for example by the email server. When the system renders the email as speech, it parses the email content and detects all the tags. As the email is rendered as speech, each contributors' content is rendered in a separate and distinct voice mode. Thus, the listener can more readily ascertain who contributed the content they are listening to due to the changing voice mode. Moreover this allows the speech interface to provide some level of command and control for the user to jump between different responses. For example, it is envisioned that the user would be able to give the voice command "go to comments from sender A". The system processes these commands and then responsively renders those messages and/or comments from sender A to the user. The rendering of the text with the original message and other messages from the original source in one voice mode, and the reply and other messages from the other source (the recipient) in another mode, allows the listener to much more easily recognize who was the source of the portion of the message they are listening to.

The format or structure and syntax of the tags used to separate the original email content from the reply content, and replies from further replies, and replies from replies from additional sources or third parties, is not particularly important and is considered within the ability of persons skilled in the art. The tag would be expected to have a syntax and structure such that it would be recognized by the software that parses email and renders the content as speech. Preferably the format is such that it can be recognized or used in combination with a variety of XML-based languages, including Voice XML, SALT, and XHTML.

Voice Rendering of Email with Voice Memos

As noted above, when a person is listening to their emails rendered as speech, the user may wish to insert a voice response directed to a particular part of an email, instead of or in addition to responding to the email as a whole. A voice response to a particular part of an email is termed a "voice memo" herein. In another aspect of this invention, the user is provided with a method and means for inserting a voice memo at any given point of an email.

Figure 4:
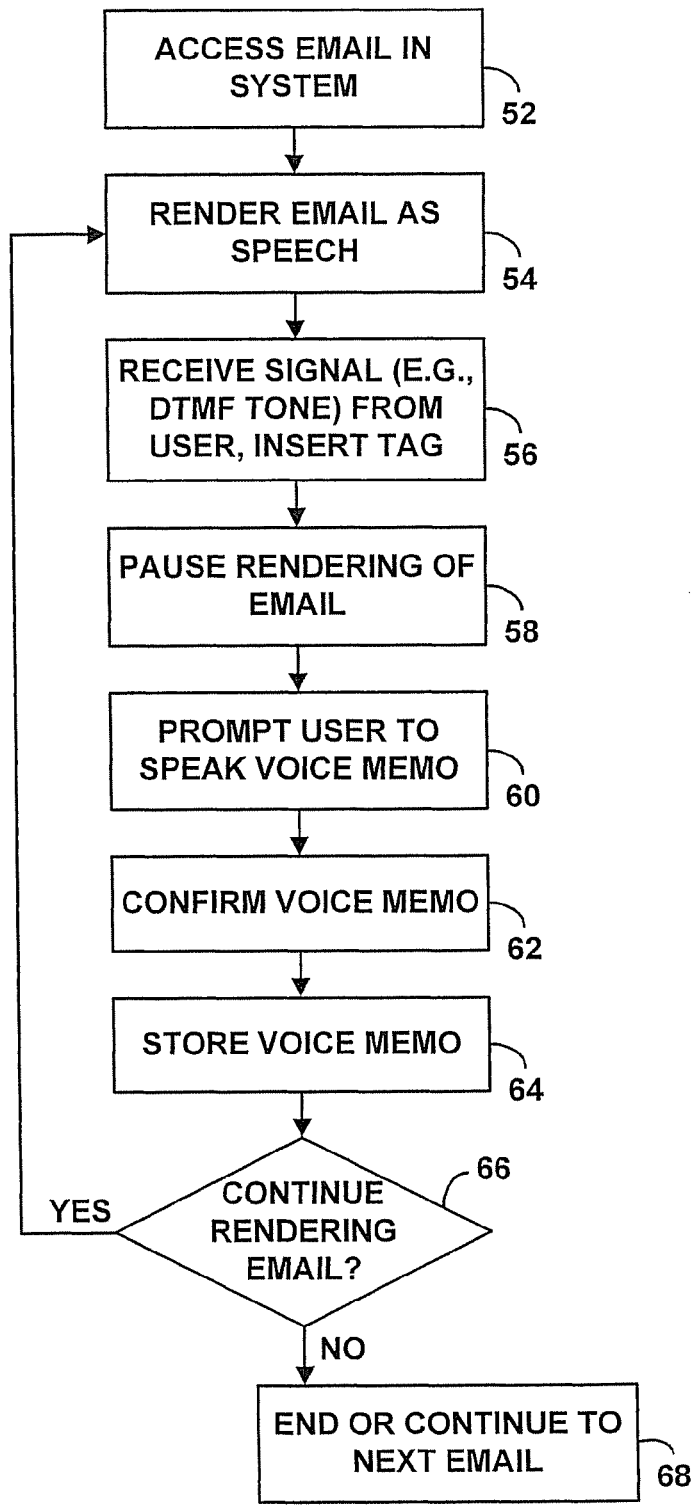
FIG. 4 is a flow chart showing the series of steps performed when a user inserts a voice memo as a reply to an email rendered as speech.

Referring now to FIG. 4, this feature will now be explained in further detail. At step 52, a user of a wireless device capable of providing speech input (e.g., a cellular phone) accesses the system 10 and accesses or otherwise navigates to the feature wherein their emails are accessed. At step 54, an unopened email is retrieved and rendered as speech. The user begins to listen to the email message. When they hear a portion of the message that they wish to insert a specific voice memo response, they send a signal to the system that they wish to insert a voice memo. This signal could be sent by a pressing of a particular button on their phone which causes a DTMF (Dual Tone Multi-Frequency) tone to be send from the phone to the system. The tone is detected by DTMF detection circuitry in the system. Alternatively, the signal could be provided by a voice command, such as by speaking "insert comment", "comment", or other speech pattern that would be recognizes as a command to insert a voice memo. The signal is received at step 56.

At this point, the TTS software executing in the system rendering email as speech changes state to allow the user to provide a voice memo. At step 58, the rendering of the email content as speech is temporarily paused. A tag is inserted into the email to indicate that a voice memo is being stored, e.g., <voicememo>. The system inserts a tag into the email that indicates that voice memo is being inserted in the email. The voice memo tag may take the form of a XML tag with attributes including duration, and size (bytes) of the voice memo. The tag may alternatively contain a hyperlink or pointer that points to a memory location or file storing the voice memo.

At step 60, the user is then prompted to provide their comment as speech for example by the prompt "Please say the comment you wish to insert. When you are finished, press #." When the system is finished recording the voice memo, the system asks the user to confirm the voice memo at step 62. At step 64, the user then provides the speech and it is saved and stored, e.g., in the voice memo store 34.

The processing continues to step 66 where the user is prompted to indicate whether to continue rendering of the email in speech. If so, the processing reverts back to step 54 and the continued rendering of the email. Steps 56-64 may execute again and the user may insert more than one voice memo. If the user indicates at step 66 that they do not wish to continue with the rendering of the email, the process ends at step 68 and the next email message is retrieved. The reply message with the voice memo file is forwarded from the system 10 to the email server for the recipient of the reply, e.g., the email server for the computer 24.

Later, when the reply message is rendered to the computer 24, the email server parses the reply and detects the tag indicating that the email includes a voice memo reply. The object or file containing the voice memo is accessed. The voice memo is rendered as speech to the user of the computer 24 or as text, at the point in the message designated by the user. The voice memo could be rendered in a different voice mode, as described above, depending on the capabilities of the email server or system servicing the computer 24 and any preferences for the user of computer 24.

Thus, to summarize, a method is providing of allowing a recipient of an email message from a source to respond to the email message via voice, comprising the steps of: rendering the email message to the recipient; as the email is being rendered, receiving a signal from the recipient indicating the recipient intends to respond to the email message by inserting a voice memo at a particular location in the email message; inserting a tag into the email indicating a voice memo is included in the reply, receiving and storing the voice memo; and rendering the voice memo to the source. The voice memo could be rendered as speech, or, alternatively as text if a speech to text engine is available and the user accesses their email via a graphical (text) user interface.

Figure 5:
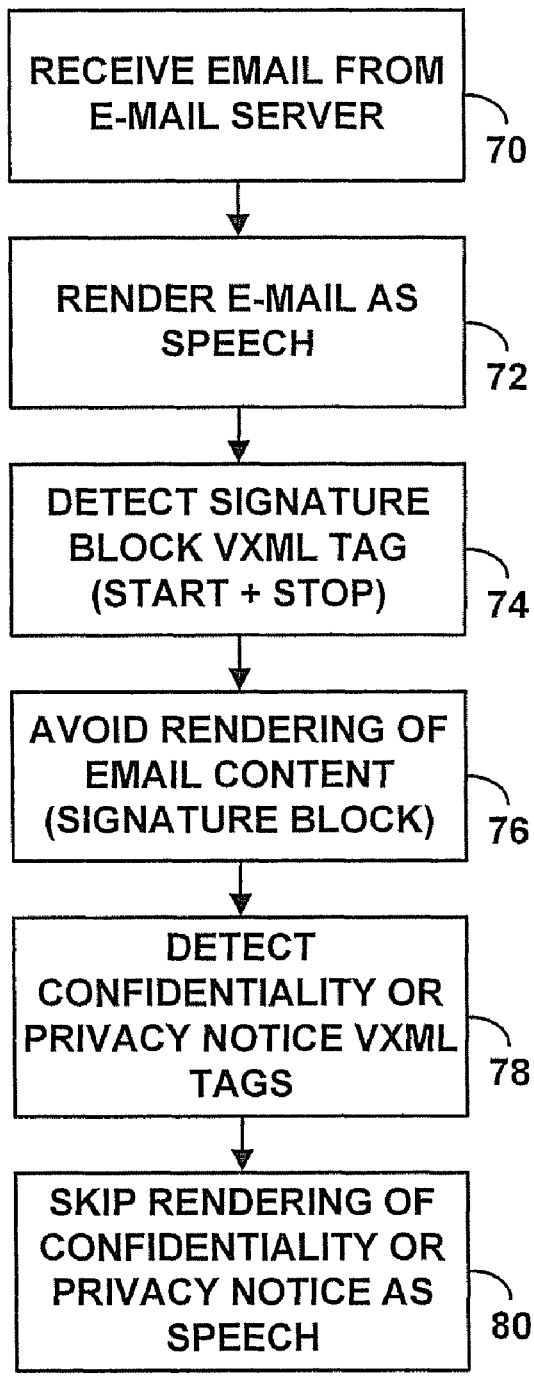
FIG. 5 is a flow chart showing the series of steps in rendering an email as speech and detecting tags delineating signature blocks, privacy notices or confidentiality notices in the email so that they may not be rendered as speech to the user (depending on the user's preferences).
Figure 6:
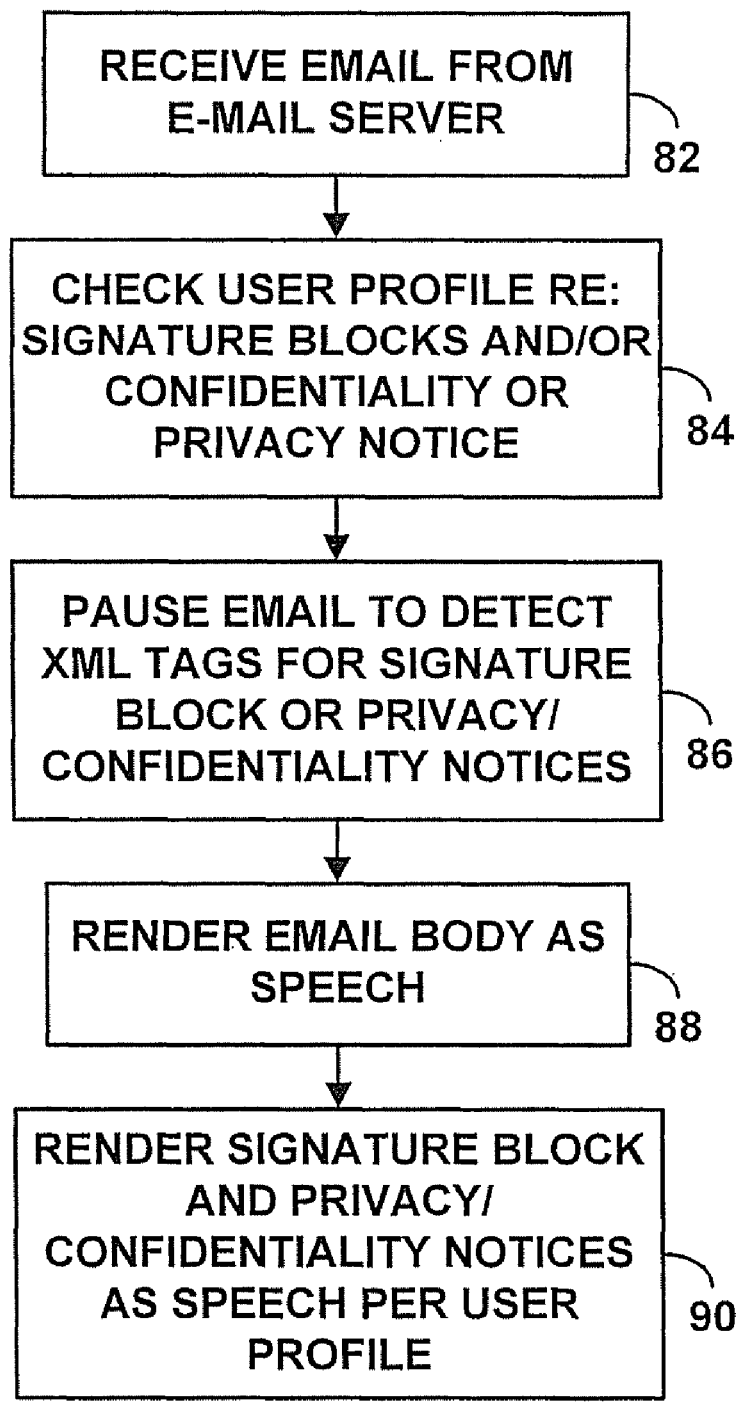
FIG. 6 is an alternative embodiment to the flow chart of FIG. 5 in which a user's profile is consulted to determine whether to render signature blocks, privacy notices or confidentiality notices as speech.

Voice Rendering of Email with Tags to Separate Content from Signature Blocks, Privacy Notices and Confidentiality Notices Referring now to FIGS. 5 and 6, we will now describe a feature in which tags are inserted into an email message in order to eliminate rendering of signature blocks and confidentiality and privacy notices as speech. As noted above, many email messages, particularly those generated in a work context, include signature blocks. These signature blocks typically contain the name of the employer, complete mailing address of the recipient, phone and fax numbers. They may also be accompanied by privacy and/or confidentiality type notices warning the user not to disclose the contents of the email to others, to delete the email if they have received in error, etc. When email messages are rendered as speech, it can be annoying listening to the signature block, or the privacy or confidentiality notices, rendered as speech. To overcome this problem, the email server or, less preferably, the client application inserts an additional tag (such as an XML tag) that separates the signature block from the body of the email content. When the TTS engine in the system renders the email as speech, it detects the presence of the signature block tag. The system may then intelligently avoid rendering the signature block as speech. The process can be extended to insertion of tags separating the privacy and confidentiality notices from the body of the email, detecting the tags, and not rendering these notices as speech.

In preferred embodiments, the user of the system that is accessing their email is provided with a set of parameters that govern how they wish to have their email rendered to them as speech. The user is able to program or configure their email access profile, where they can select to not receive the signature blocks (or privacy and confidentiality notices) as speech or, conversely, select to receive them if they so wish. Alternatively, the user could be prompted to indicate whether they wish to have a signature block, confidentiality notice, or privacy notice rendered as speech, at the time they access their email.

FIG. 5 shows how the process would work in a situation where the system 10 is configured to simply disregard the signature blocks and confidentiality notices, rather than enquire as to the user preferences. At step 70, the system 10 receives an email from the email server. At step 72, the email is rendered as speech. At step 74, the email parser 32 (FIG. 2) detects the XML tags indicating the start and stop of the signature block. An example of the tags could be <SIGNATUREBLOCK> placed before the beginning of the signature block and </SIGNATUREBLOCK> placed at the end of the signature block. At step 76, the body of text between the tags is skipped, i.e., not rendered as speech. At step 78, the email parser detects the start and stop tags for the confidentiality/privacy notice, e.g., <NOTICE> and </NOTICE>. At step 80 the TTS engine skips over the rendering of all text between the notice tags.

Obviously, the email server 20 is provided with logic to identify what constitutes a signature block in an email message. This logic may search for the combination of names and phone numbers, or names, phone numbers and address, or perhaps other characters or information indicating that a "canned" or standard signature block in the form of a file is inserted into the email. Similarly, the email server 20 would identify a confidentiality notice by looking for key text such as "CONFIDENTIALITY NOTICE", "This message is intended for receipt by the designated recipient . . . " etc. Alternatively, if the confidentiality notice is inserted in the original email message as a link to a file it may be identifiable by the presence of links, HTML tags, or other features in the email that indicate the presence of the confidentiality notice. The identification of the signature block and confidentiality notice would be more simple if the email client application inserts the XML tags directly, instead of the tags being inserted by the email server 20. It is contemplated that very simple signature blocks such as just the name of the sender may not be identifiable, but those signature blocks are not necessarily annoying to listen to. The invention is primarily concerned with complete signature blocks, which are more annoying to listen to, and which are easier to detect due to the presence of phone numbers, fax numbers, mailing addresses, etc., or by virtue of the signature block being an attachment to the email, for example in the form of an electronic business card, Outlook contacts file, etc.

FIG. 6 shows the process when user profiles are checked to determine whether to render a signature block or confidentiality notice as speech. There may be instances when a user wishes to hear a signature block rendered in its entirety so as to ascertain the contact information. The user accesses the system 10 of FIG. 1 and accesses their email. The process begins at step 82 with the system 10 retrieving the email message from the email server 20. At step 84, the system 10 checks the user profile database 36 (FIG. 2) to determine the user preferences for rendering signature blocks and confidentiality type notices as speech.

At step 86, the email parser 32 parses the mail to detect the XML tags for signature blocks or privacy/confidentiality type notices. At step 88, the email content is rendered as speech. At step 90, the TTS engine would then render (or not render) the signature block and privacy/confidentiality notice as speech per the settings in the user profile as determined at step 84.

Navigational Controls of Speech Email Using Tags

As noted above, the placement of the tags delimiting original email content, reply content, replies to replies, etc., provides a feature by which the user can exercise navigational control over the rendering of the email as speech, either by giving voice commands to the system rendering email as speech or providing input commands in other form, for example by pressing buttons on the wireless device and using DTMF tones to conduct the navigation. For example, the user can jump between different responses such as by providing a voice command "go to replies from sender A", whereupon the system reads only the replies of sender or source A. Examples of other commands may be "skip this reply", "go back to the original email message", "stop", "pause", "go to the last reply from A" (where A is a source of the email reply), "go to the reply from B", etc.

This implementation feature assumes that the system has a speech recognition engine, application grammar set, and software to process voice input that interacts with the email rendering software and email parser to carry out the user's commands. Inasmuch as voice command platforms that process user speech input are known in the art, and systems rendering email as speech are known in the art, the implementation of this features is considered within the ability of persons in the art from the present disclosure.

As noted above, the feature of inserting tags into the email could be done by an email client application. Thus, in one possible embodiment, we have provided an improvement to an email client application. In particular, the email client application is stored as a set of instructions on a machine-readable storage medium; the set of instructions are enabling a user to generate an email message. In the improvement, the instructions insert a tag in the email message that separates email content from a signature block. In a further optional improvement, the instructions insert a tag in the email message that separates email content from a privacy notice and/or a confidentiality notice. In another possible improvement, the instructions insert the tag at a location in order to separate previous email content, e.g., the original message, from a new message, e.g., a reply. When the email is transmitted to the system 10 and rendered as speech in a TTS engine, the system 10's email parser will parse the email and detects the tag(s), and use the tags as described in detail above.

In more preferred embodiments, the email server is provided with instructions that process email messages and inserts the tags as described herein, such as the tags separating the original and reply message, tags separating the signature block and confidentiality block from email content, and tags indicating a voice memo reply is present in an email message.

While a representative embodiment has been described with particularity, persons skilled in the art will appreciate that variation from the disclosed embodiments is possible and will vary depending on the specifics of the implementation. Furthermore, the functionality of the voice command platform and the implementation of the various modules shown in FIG. 2, including the email parser 32, may change and these modules could be combined with other modules or implemented in discrete processing units. The implementation details in hardware or software is not particularly important.

Furthermore, the use of the term "tag" in the claims is intended to mean a single tag, or multiple tags (typically used in pairs) as is conventional in XML. As noted above, the format or structure of the tag is not particularly important and will probably vary among different implementations and service providers. Any software structure, typically but not necessarily invisible to the user, that acts as a flag, code, or other mechanism delimiting, formatting or organizing an email message is considered to be equivalent to the XML tags disclosed herein and therefore considered within the literal scope of the term "tag." The true scope of the claims will be ascertained by reference to the appended claims, interpreted in light of the foregoing.

The invention claimed is:

1. A method of rendering an email message as speech, wherein the email message comprises email body content and a signature block, the method comprising:
   a voice command platform processing the email message to identify the signature block in the email message; and
   the voice command platform rendering the email body content as speech but avoiding rendering the identified signature block as speech.

2. The method of claim 1, wherein processing the email message to identify the signature block comprises detecting a tag indicating a start of the signature block and detecting a tag indicating a stop of the signature block.

3. The method of claim 1, further comprising:
   before the voice command platform processing the email message, the voice command platform receiving the email message from an email server.

4. A method of rendering an email message as speech, wherein the email message comprises email body content and a privacy notice, the method comprising:
   a voice command platform processing the email message to identify the privacy notice in the email message; and the voice command platform rendering the email body content as speech but avoiding rendering the identified privacy notice as speech.

5. The method of claim 4, wherein processing the email message to identify the privacy notice comprises detecting a tag indicating a start of the privacy notice and detecting a tag indicating a stop of the privacy notice.

6. The method of claim 4, further comprising:
before the voice command platform processing the email message, the voice command platform receiving the email message from an email server.

7. A method of rendering an email message as speech, wherein the email message comprises email body content and a confidentiality notice, the method comprising:
a voice command platform processing the email message to identify the confidentiality notice in the email message; and
the voice command platform rendering the email body content as speech but avoiding rendering the identified confidentiality notice as speech.

8. The method of claim 7, wherein processing the email message to identify the confidentiality notice comprises detecting a tag indicating a start of the confidentiality notice and detecting a tag indicating a stop of the confidentiality notice.

9. The method of claim 7, further comprising:
before the voice command platform processing the email message, the voice command platform receiving the email message from an email server.

10. A method of rendering an email message as speech to a recipient of the email message, comprising:
a voice command platform processing the email message to identify email content and a signature block;
the voice command platform rendering the email content as speech;
the voice command platform referring to a user profile to determine whether to render the signature block as speech; and
the voice command platform rendering, or not rendering, the signature block as speech in accordance with the user profile.

11. A method of rendering an email message as speech to a recipient of the email message, comprising:
a voice command platform processing the email message to identify email content and a signature block;
the voice command platform rendering the email content as speech;
the voice command platform detecting a tag separating a signature block from the rest of the email content;
the voice command platform prompting a user to indicate whether to render the signature block as speech; and
the voice command platform rendering, or not rendering, the signature block as speech in accordance with a response to the prompt.

* * * * *